US006103397A

United States Patent [19]

Sugimoto et al.

[11] Patent Number: 6,103,397

[45] Date of Patent: Aug. 15, 2000

[54] METALLIC POROUS PRODUCT AND COMPOSITE PRODUCT THEREOF AND METHOD OF PRODUCING THE SAME

[75] Inventors: Yukihiro Sugimoto; Nobuyuki Oda; Kazuyuki Yoshimoto; Makoto Fujita; Yukio Yamamoto, all of Hiroshima, Japan

[73] Assignee: Mazda Motor Corporation, Hiroshima, Japan

[21] Appl. No.: 09/037,663

[22] Filed: Mar. 10, 1998

[30] Foreign Application Priority Data

| | | | |
|---|---|---|---|
| Mar. 11, 1997 | [JP] | Japan | 9-056700 |
| Mar. 11, 1997 | [JP] | Japan | 9-056701 |
| Jan. 19, 1998 | [JP] | Japan | 10-008046 |

[51] Int. Cl.[7] .............................. B32B 5/18; B22F 3/11; B22F 5/02

[52] U.S. Cl. .......................... 428/613; 428/614; 428/558; 428/561; 428/566

[58] Field of Search .................................... 428/613, 614, 428/553, 558, 564, 550, 566, 561

[56] References Cited

U.S. PATENT DOCUMENTS

| | | |
|---|---|---|
| 4,334,507 | 6/1982 | Kohnert et al. . |
| 5,588,477 | 12/1996 | Sokol et al. . |
| 5,858,056 | 1/1999 | Fujine et al. . |

FOREIGN PATENT DOCUMENTS

| | | |
|---|---|---|
| 57-174484 | 10/1982 | Japan . |
| 58-204137 | 11/1983 | Japan . |
| 1-15347 | 3/1989 | Japan . |
| 2-30790 | 7/1990 | Japan . |
| 3-30708 | 5/1991 | Japan . |
| 5339605 | 12/1993 | Japan . |
| 06306672 | 1/1994 | Japan . |
| 07150270 | 6/1995 | Japan . |

*Primary Examiner*—Deborah Jones
*Assistant Examiner*—Jason Savage
*Attorney, Agent, or Firm*—Nixon Peabody LLP; Donald R. Studebaker

[57] ABSTRACT

A metallic porous product is produced by applying a slurry of a mixture of skeleton constituent metal particles and property modifying particles to an inflammable porous foam, burning the inflammable porous foam having open pores by heat to provide a metallic skeleton structure, and sintering the metallic skeleton structure.

4 Claims, 6 Drawing Sheets

METALLIC POROUS PRODUCT AND COMPOSITE PRODUCT THEREOF AND METHOD OF PRODUCING THE SAME

BACKGROUND OF THE INVENTION

1. Field of the Invention

The invention relates to a metallic porous product used as a reinforcement for producing a light alloy composite product having an aluminum alloy or a magnesium alloy as its structural metal and a method of producing the metallic porous product, and, more particularly, to a metallic porous product which is improved in wear resistance without causing aggravation of toughness, one of essential physical properties inherent by nature in metals, and a light alloy composite product made by the use of the metallic porous product with an effect of improving its physical properties, and a method of producing the metallic porous product and the light alloy composite product.

2. Description of the Related Art

Pistons and its associated parts of a diesel engine are typically made of a high silicon aluminum alloy, such as AC8A specified by Japanese Industrial Standard, which has low thermal expansion and high wear resistance. For example, a piston is subjected to tremendous thrust force repeatedly imposed on piston rings fitted in ring grooves of the piston on the firing strokes and a zone of the high silicon aluminum alloy piston where the ring grooves are formed is not always adequate in respect to wear resistance and fatigue deformation resistance. For this reason, further improvement of physical properties of the piston has been long desired.

The inventors of this application have studied improvement of light alloy composite products and metallic porous products preparatorily provided for producing the light alloy composite product. As a result of the study, as described in Japanese Patent Publications Nos. 2 - 30790 and 3 - 30708, the inventors have come up with a useful technique for improving physical properties of a light alloy composite product by impregnating a metallic porous product as a reinforcement of a light alloy composite product with a molten light alloy so as thereby to produce an intermetallic compound at an interface between these metallic porous product and impregnated light alloy. As described in Japanese Patent Publication No. 1 - 15347, the inventors have also come up with a light alloy composite product provided by filling metal powders, ceramic powders or carbon powders in open pores of a metallic porous product and impregnating it with a molten light alloy. These metallic porous products have a high porosity and are widely used as, for example, a catalyst support and a battery base because of a high filling factor for a catalyst or an active material.

There have been known as one of methods of producing metallic porous members having a porosity greater than approximately 90% a metal plating method such as described in, for example, Japanese Unexamined Patent Publication No. 57 - 174484 in which a metal is deposited on a foamed resin and a slurry coating method such as described in, for example, Japanese Unexamined Patent Publication No. 5 - 339605 in which a metallic porous product is made by sintering a metallic skeleton structure prepared by burning a foamed resin sheet impregnated with a metal powder slurry.

The prior art light alloy composite products still have some problems remaining unsolved. For example, even the light alloy composite products described in Japanese Unexamined Patent Publications Nos. 2 - 30790 and 3 - 30708 mentioned above have hardness between approximately 150 and 700 micro-vickers. In some applications of the light alloy composite product, desired wear resistance, which depends upon the hardness of a metallic porous product or the hardness of an intermetallic compound formed at an interface between the metallic porous product and base metal of the light alloy, is not always provided by that hardness of the light alloy composite product. In particular, in the case where the light alloy composite product is used as a material for part of a piston in which piston ring grooves are formed, it admits of improvement of physical properties. While the wear resistance may be improved by means of an increase in the volume portion of the metallic porous member relative to the light alloy composite product, this leads to an insufficient porosity with the result of increasing pressure necessary to impregnate a molten light alloy to approximately 30–300 $kg/cm^2$.

While the prior art light alloy composite product described in Japanese Patent Publication No. 1 - 15347 mentioned above yields improved wear resistance due to powders of metals, ceramics or carbon powders filled in open pores of the metallic porous product, however, the powders tend to aggregate when filled in the open pores and consequently the problem that pressure necessary to impregnate a molten light alloy must be increased is left remaining unsolved.

In view of the above problems, in order for the light alloy composite product to yield significantly improved wear resistance, it has been long desired to disperse ceramic powders almost uniformly in the metallic porous product and to reduce the pressure necessary to impregnate a molten light alloy as low as possible.

SUMMARY OF THE INVENTION

It is an objective of the invention to provide a metallic porous product with an improved wear resistance and a high quality light alloy composite product made by the use of the metallic porous product.

It is another object of the invention to provide a method of producing a high wear resisting metallic porous product and a high quality light alloy composite product made by the use of the metallic porous product.

The foregoing objects of the present invention are achieved by providing a metallic porous product which contains property modifying particles almost uniformly dispersed in or alloyed with a skeleton structure thereof. The skeleton constituent metal comprises at least one of metals including nickel (Ni), iron (Fe) and copper (Cu) and alloys and alloys including nickel matrix alloys, iron matrix and copper matrix alloys. The property modifying particles comprise at least one of metals and ceramics including silicon carbide (SiC), a silicon oxide ($SiO_2$), an aluminum oxide ($Al_2O_3$), a titanium oxide ($TiO_2$), a silicon nitride ($Si_3N_4$), an aluminum nitride (AlN) and a titanium nitride (TiN). The ceramic content of the metallic porous product is between 5 and 30 volume %.

In the metallic porous product whose skeleton constituent metal is nickel (Ni) or one of nickel matrix alloys, the metallic porous product contains chromium (Cr) used as the property modifier at the content between approximately 25 and 35 weight %.

The metallic skeleton structure is almost uniformly impregnated with a light alloy to produce a light alloy composite product suitably used as, for example, parts of a piston for an internal combustion engine.

The metallic porous product is produced by a method including the steps of preparing an inflammable porous foam having open pores, applying a slurry of a mixture of skeleton constituent metal powders and property modifying particles to the inflammable porous foam, burning the inflammable porous foam applied with the mixture slurry by heat to leave a metallic skeleton member, and sintering the metallic skeleton member.

A molten light alloy is filled in a mold in which the metallic porous product is put to impregnate the metallic porous product with the molten light alloy filled in open pores, providing a light alloy composite product. The impregnation of the metallic porous product, which is desirably produced to have a porosity between 80 and 95%, with the molten light alloy under a gauge pressure higher than 0.15 $kg/cm^2$.

BRIEF DESCRIPTION OF THE DRAWINGS

The foregoing and other objects and features of the present invention will be clearly understood from the following detailed description of preferred embodiments when read in conjunction with the accompanying drawings in which.

DETAILED DESCRIPTION OF THE PREFERRED EMBODIMENT

A metallic porous product having an improved physical property or wear resistance and a light alloy composite product improved in its physical properties by use of the metallic porous product were gained based on the knowledge as a result of studies made from different angles by the inventors of this application that a metallic porous product was significantly improved in wear resistance by dispersing metal particles or hard ceramic particles in a skeleton constituent metal of the metallic porous product and that a light alloy composite product significantly improved in wear resistance was gained by the use of the metallic porous product as a reinforcement.

The metallic porous product of the invention includes a skeleton constituent metal which comprises a metal selected from a group of nickel (Ni), iron (Fe) and copper (Cu) and/or an alloy selected from a group of nickel matrix alloys, iron matrix alloys and copper matrix alloys. Each of these metals is able to alloy with a light alloy such as an aluminum alloy which the metal covers by enveloped casting and makes contribution to improvement of physical properties of the metallic porous product. The skeleton constituent metal may be provided in the form of alloyed particles when a slurry of the skeleton constituent metal is prepared or may be provided as a mixture of two or more different metals which are alloyed together when sintered. The latter case takes the same forming way as the case where metal particles are used as a modifier to improve physical properties of the skeleton constituent metal.

The metallic porous product with a metallic skeleton structure impregnated with a light alloy by filling its open pores with a molten light alloy provides a light alloy composite product with a significantly improved wear resistance. Because, different from the prior art method, the metallic porous product is provided without filled with metal particles, ceramic particles or carbon particles in its open pores before it is impregnated with a molten light alloy, impregnation with a molten light alloy is easily achieved under a relatively low pressure. While metals, ceramics or carbon may be, individually or in combinations, used as a property modifier to improve physical properties as taught in the Japanese Patent Publication 1 - 15347 mentioned above, ceramics or metals which are able to alloy with the skeleton constituent metal through sintering are more desirable. As long as a metal is capable to alloy with the skeleton constituent metal when sintered and, as a result, improves physical properties, such as wear resistance, of the metallic porous product, it is not always restricted to specific kinds. In the cases where nickel and/or a nickel matrix alloy are employed as the skeleton constituent metal, chromium is suitable as the modifier for the skeleton constituent metal, and the chromium content of the metallic porous product is preferably between 25 and 35 weight %.

Figure 1:
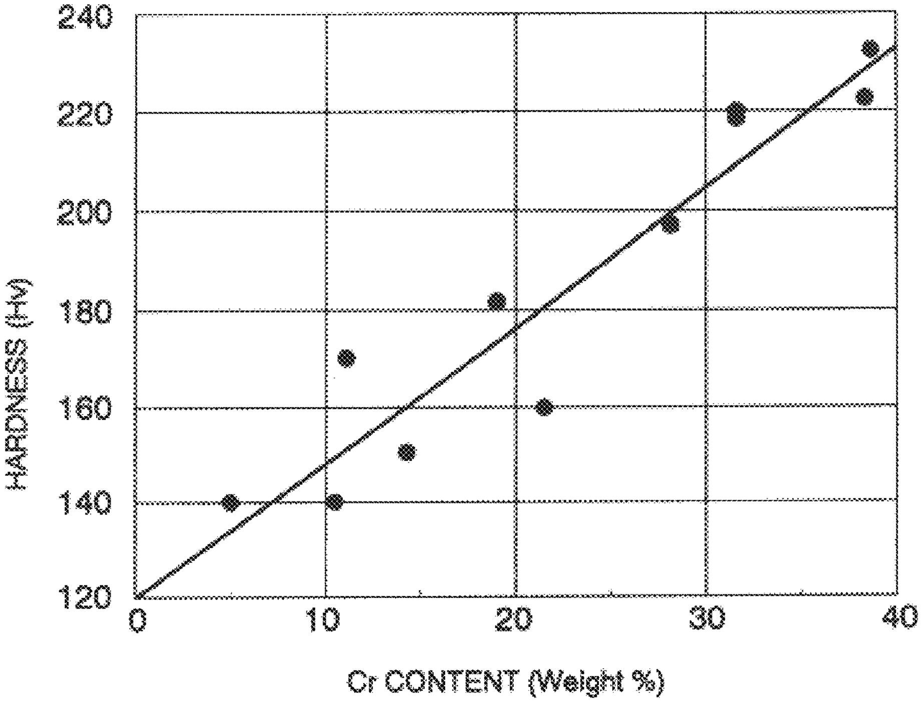
FIG. 1 is a diagrammatic view showing the relationship between hardness and chromium content of a metallic porous product.

FIG. 1 is a diagrammatic view showing the relationship between the chromium content and the hardness of metallic porous product. As apparent from FIG. 1, while the metallic porous product increases its hardness, i.e. the wear resistance, with an increases in its chromium content, however, the chromium makes the metallic porous product brittle when contained in excess, as a result of which the metallic porous product (which is typically press-formed) used as a reinforcement of a light alloy composite product experiences a decline in formability. The reinforcement for a light alloy composite product is required to have a vickers hardness of approximately 200. In this point of view, a desirable range of chromium contents of the metallic porous product is between 25 and 35 weight %.

As ceramics available as the modifier, there are a carbide of aluminum (Al), titanium (Ti) or chromium (Cr), a nitride of aluminum (Al), titanium (Ti) or chromium (Cr), a carbonized-nitride of aluminum (Al), titanium (Ti) or chromium (Cr), an oxide of aluminum (Al), titanium (Ti) or chromium (Cr), a carbide of vanadium (V), niobium (Nb) or tantalum (Ta), a nitride of vanadium (V), niobium (Nb) or tantalum (Ta), a carbonized-nitride of vanadium (V), niobium (Nb) or tantalum (Ta), which are well known as high strength, heat resisting ceramics. In view of effectively improving wear resistance, it is desirable to employ one or more of ceramics such as a silicon carbide (SiC), a silicon oxide ($SiO_2$), an aluminum oxide ($Al_2O_3$), a titanium oxide ($TiO_2$), a silicon nitride ($Si_3N_4$), an aluminum nitride (AlN), a titanium nitride (TiN) and the like. The ceramic content of the metallic porous product is desirably between 5 and 30 volume %. If the metallic porous product has its ceramic content less than 5 volume %, the ceramic particles do not yields any effect of improving wear resistance of the metallic porous member. On the other hand, if the metallic porous product has its ceramic content over 30 volume %, less metal particles are bound, which always results in a decline in the strength of the metallic porous product. As described above, impregnation of the metallic porous product with a light alloy among its metallic skeleton structures brings about a significant improvement of wear resistance of the light alloy composite product which is fully acceptable for piston parts of an internal combustion engine.

The metallic porous product is produced by a method which is basically an application of the slurry coating method previously described. A slurry is prepared by adding a mixture of particles selected from a metal group of nickel (Ni), iron (Fe) and copper (Cu) and/or a group of nickel matrix alloys, iron matrix alloys and copper matrix alloys as a skeleton constituent metal and ceramics particles of a silicon carbide (SiC), a silicon oxide ($SiO_2$), an aluminum oxide ($Al_2O_3$), a titanium oxide ($TiO_2$), a silicon nitride ($Si_3N_4$), an aluminum nitride (AlN) or a titanium nitride (TiN), or alloying metal particles of chromium (Cr) as a property modifier into a solvent. While a water-soluble phenolic resin is used as the solvent in this embodiment, any available solvent may be employed.

An inflammable foam having open pores is impregnated with the mixture slurry to apply a slurry coating over the whole surface thereof. While any inflammable porous foam which burns and disappears when heated may be employed. A polyurethane resin is one of the typical materials which are foamed to provide the inflammable foam and easily burn and disappear by heat. Subsequently, the porous foam is heated to burn and disappear, leaving a metallic skeleton structure. This metallic skeleton structure is sintered to turn to a porous metal product with the property modifier such as ceramic particles and metal particles dispersed in the skeleton constituent metal. After the porous foam has burnt and disappeared, the metallic porous product may contain a small amount of impurities such as carbon left therein.

In a composite process, a molten light alloy is poured and filled in a mold with the metallic porous product put therein and is impregnated in open pores of the metallic porous product, as a result of which these light alloy metal and metallic porous product are composed as a light alloy composite product.

The inventors of this application have further studied a practical step to provide a light alloy composite product with improved wear resistance even by impregnating a metallic porous product with a molten light alloy under a pressure as low as possible. As the result of the studies, it was revealed that, in the composite process that a light alloy composite product was made by pouring and filling a molten light alloy metal in a mold with a porous product formed from a metal or a material mainly composed of a metal put in the mold to impregnate the metallic porous product with the light alloy, a specific range of porosity of the metallic porous product yielded a desired physical property of the light alloy composite product even when the impregnation of the metallic porous alloy with the molten light alloy was performed under pressure as low as possible.

Specifically, in the composite process where the impregnation is performed at a gauge pressure in a range between approximately 0.15 and 10 kg/cm$^2$, in order for the metallic porous product to be impregnated with the light alloy with an intended effect of improving its physical property, it is required to have a volume of 5 to 20%, i.e. a porosity of 80 to 95%. If the lower limit is exceeded, the light alloy composite product composed of the metallic porous product does not exhibit the intended physical property. On the other hand, if the upper limit is exceeded, the lowest gauge pressure necessary for the impregnation increases in excess. While basically the slurry coating method may be applied to preparation of a metallic porous product, the method of the invention in which a metallic skeleton structure is prepared through sintering thereof after having burnt an inflammable foam with a slurry coat of a mixture of skeleton constituent metal and modifier applied thereto provides a metallic porous product, and hence a light alloy composite product, with a significantly improved physical property, i.e. wear resistance.

Light alloy composite products according to embodiments of the invention were prepared and evaluated as to hardness.

Figure 2:
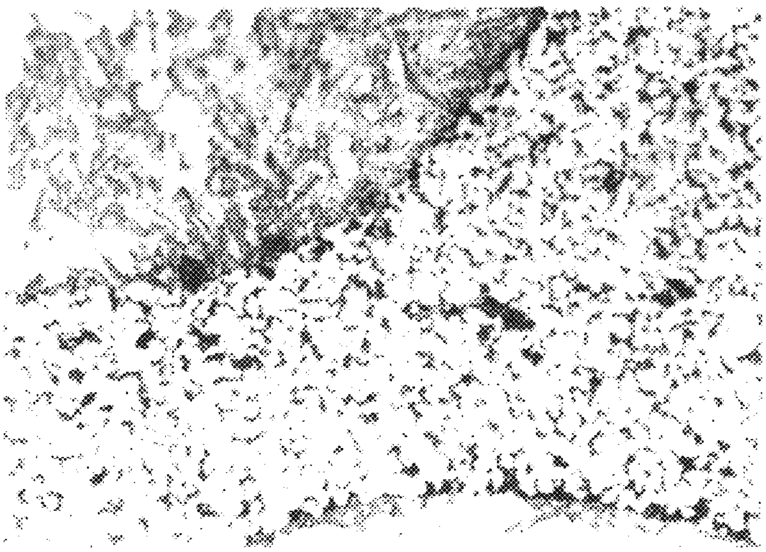
FIG. 2 is a photomicrograph showing a metallographic structure of an aluminum alloy composite product provided by the use of a metallic porous product of which the titanium oxide content is 20 volume %.
Figure 3:
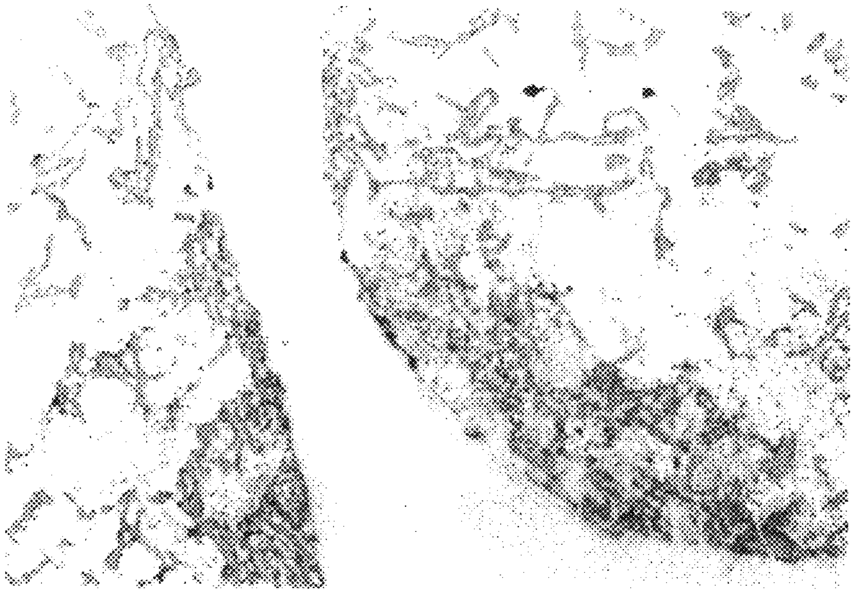
FIG. 3 is a photomicrograph showing a metallographic structure of an aluminum alloy composite product provided by the use of a metallic porous product which contains no titanium oxide.

In order to provide an aluminum alloy composite product as an example, a slurry was prepared by adding a mixture of pure nickel particles having an average grain size of 4 $\mu$m and particles of titanium oxide ($TiO_2$) having an average grain size of 0.5 $\mu$m to a solvent of water-soluble phenolic resin. The titanium oxide content of the mixture was at most approximately 40 volume %. A polyurethane resin foam having 30 open pores per inch was dipped in and impregnated with the mixture slurry to form a mixture slurry coating thereon. Subsequently, the polyurethane resin foam was dried and burnt to disappear, leaving a skeleton structure of sintered nickel with particles of titanium oxide ($TiO_2$) dispersed almost uniformly in the skeleton constituent nickel. The nickel porous product thus provided had a volume of 6%. The nickel porous product was impregnated with a molten aluminum alloy, specified as AC8A by Japanese Industrial Standard to provide an aluminum alloy composite product. FIGS. 2 and 3 are photomicrographs showing metallographic structures of an aluminum alloy composite product provided by the use of a metallic porous product containing a metal mixture of a 20 volume % titanium oxide content and an aluminum alloy composite product provided by the use of a metallic porous product containing a metal mixture which has no titanium oxide, respectively. As seen in FIGS. 2 and 3, the aluminum alloy composite product according to the present invention yields uniform dispersion of particles of titanium oxide ($TiO_2$).

Figure 4:
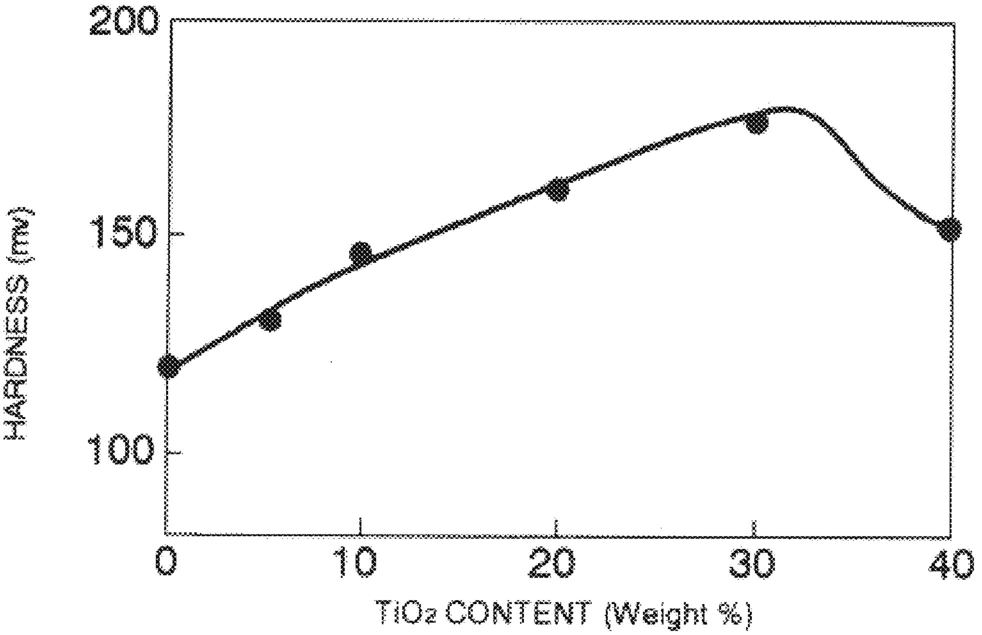
FIG. 4 is a diagrammatic view showing the relationship between hardness and titanium oxide content of a metallic porous product.

FIG. 4 shows measurements of Vickers hardness of the nickel porous product relative to titanium oxide ($TiO_2$) content. As seen in FIG. 4, the hardness of the nickel porous increases with an increase in its titanium oxide ($TiO_2$) content, which indicates that impregnation of ceramic particles makes contribution to improvement of hardness of the metallic porous product. The nickel porous product has the highest hardness at a titanium oxide ($TiO_2$) content of 30 volume % and, however, provides aggravation of hardness at yields the highest hardness at titanium oxide ($TiO_2$)

contents greater than 30 volume %. This is because the nickel porous product is made brittle as a result of containing ceramic particles in excess, and hence a decline in the portion of metal of the nickel porous product.

Figure 5:
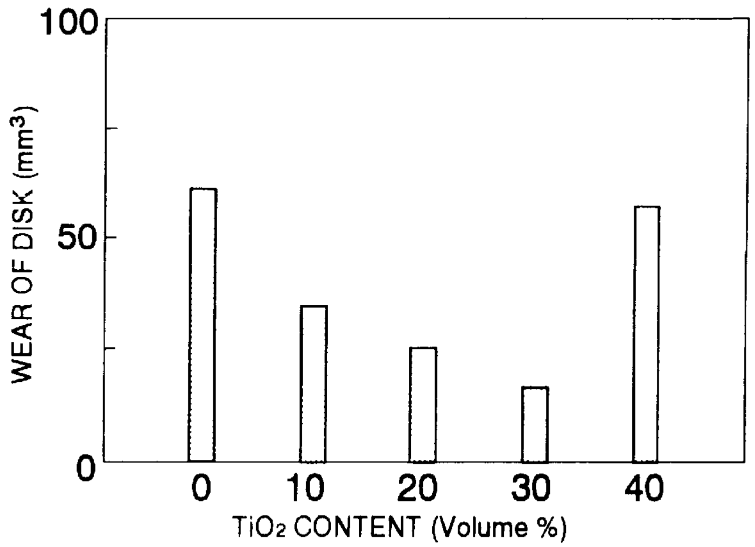
FIG. 5 is a diagrammatic view showing a result of a ring-disk wear test of aluminum alloy composite products according to a first embodiment of the invention.

A wear test was conducted to evaluate the wear resistance of different titanium oxide ($TiO_2$) contents of the nickel porous products shown in FIG. 3. The wear test, the result of which is shown in FIG. 5, was carried out by rubbing disks made of the nickel porous products and a ring together under lubrication. The condition was specified as follows:

| | |
|---|---|
| Ring Material | SCr42O (HRc45) |
| Surface Pressure | 10 MPa |
| Lubrication Oil temperature | 373° K. |
| Sliding Speed | 0.5 m/s |
| Total Sliding Distance | 5,000 m |

As apparent from FIG. 5, as compared with the aluminum alloy composite product made by the use of a nickel porous product containing no titanium oxide ($TiO_2$), the aluminum alloy composite product made by the use of a nickel porous product of which the titanium oxide ($TiO_2$) content is in a specific range yields a significantly improvement of wear resistance. If the titanium oxide ($TiO_2$) content is as high as 40 volume %, the nickel porous product is made brittle due to an insufficient amount of nickel particles sintered together, which causes a decline in wear resistance and conducts to wear due to omission of the titanium oxide particles.

An aluminum alloy composite product was made as another example from an iron porous product. In order to provide the iron porous product, a slurry was prepared by adding to a solvent of water-soluble phenolic resin a mixture of iron group metal particles and either a 15 volume % of silicon carbide particles or a 25 volume % of aluminum oxide particles. The iron group metal had an 0.1% iron content, a 0.7% chromium content and a 0.5% molybdenum content, and the particles had an average grain size of 4 μm. The silicon carbide particles or the aluminum oxide particles had an average grain size of 1 μm. A polyurethane resin foam having 30 open pores per inch was dipped in and impregnated with the mixture slurry to form a mixture slurry coating thereon. Subsequently, the polyurethane resin foam was dried and burnt to disappear, leaving a skeleton structure of sintered iron group metal with particles of silicon carbide or aluminum oxide dispersed almost uniformly in the skeleton constituent iron group metal. The porous product of iron group metal thus provided had a volume of 6%.

Measurements were made as to hardness of the porous product of iron group metal and wear resistance of an aluminum alloy composite product provided by impregnating the porous product of iron group metal with a molten aluminum alloy specified as AC8A by Japanese Industrial Standard under the same conditions as the measurements as to the previous example.

Figure 6:
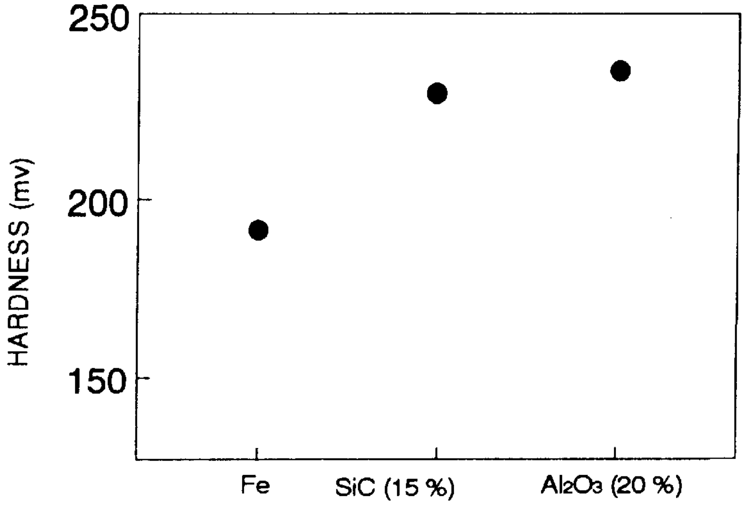
FIG. 6 is a diagrammatic view showing hardness of aluminum alloy composite products according to a second embodiment of the invention.
Figure 7:
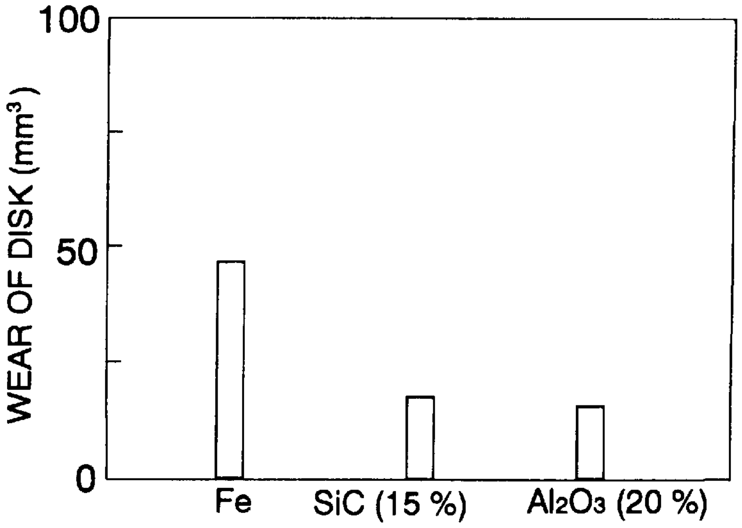
FIG. 7 is a diagrammatic view showing a result of a ring-disk wear test of aluminum alloy composite products according to the second embodiment of the invention.

FIGS. 6 and 7 show measurements of Vickers hardness and wear rate of the porous products of iron group metal, respectively. As revealed from FIGS. 6 and 7, impregnation of ceramic particles makes contribution to improvement of hardness and wear resistance of the porous product of iron group metal.

An aluminum alloy composite product was further provided from a nickel-chromium porous product with titanium oxide particles dispersed in its skeleton constituent metal. A slurry was prepared by adding to a solvent of water-soluble phenolic resin a mixture of pure nickel particles, chromium particles and titanium oxide particles. The nickel particles had an average grain size of 4 μm, and the chromium particles had an average grain size of 15 μm. The weight ratio of nickel and chromium was 70:30, and the titanium oxide content of the mixture was at most approximately 40 volume %.

Figure 8:
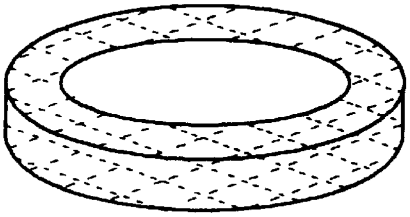
FIG. 8 is a schematic view of a ring-shaped inflammable foam.

A ring-shaped polyurethane resin foam shown in FIG. 8 was prepared and impregnated with the mixture slurry to form a mixture slurry coating thereon. Subsequently, the polyurethane resin foam was dried and burnt in a mixed gas of cracked ammonia gas and carbon dioxide at a temperature of 800° C. to carbonize and disappear. A metallic skeleton structure left as a result of burning the polyurethane resin foam was sintered in a reducing atmosphere at a temperature of 1100° C. and turned to a metallic porous product which comprises a metallic skeleton structure formed by alloying nickel with chromium and titanium oxide particles uniformly dispersed in the metallic skeleton structure.

Figure 9:
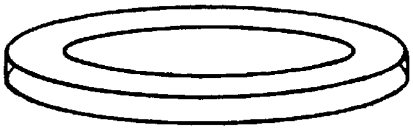
FIG. 9 is a schematic view of a light alloy composite product made by the use of the ring-shaped inflammable foam which is used as a piston ring groove reinforcement.

The metallic porous product was press-shaped to form a ring such as shown in FIG. 9 suitable for a reinforcement for a piston ring groove. The metallic porous ring had a volume of 13%, and hence a porosity of 87%. The metallic porous ring was placed in position in a mold for molding a piston. A molten aluminum alloy specified as AC8A by Japanese Industrial Standard was poured and filled in the mold and left under a gauge pressure of 1.5 $kg/cm^2$ to be impregnated in the metallic porous ring so as thereby to provide a piston with its ring groove reinforced by the aluminum alloy composite ring.

Figure 10:
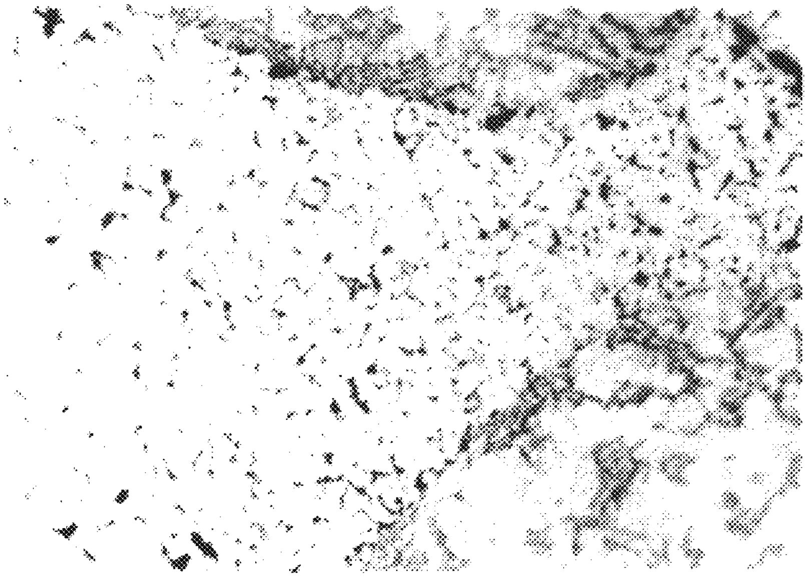
FIG. 10 is a photomicrograph showing a metallographic structure of an aluminum alloy composite product provided by the use of a metallic porous product shown in FIG. 9 of which the titanium oxide content is 20 volume %.

FIG. 10 is a photomicrograph showing a metallographic structure of an aluminum alloy composite product provided by the use of a metallic porous product containing a metal mixture of a 20 volume % titanium oxide content. As seen in FIG. 10, it is apparent that the aluminum alloy, which is a matrix, is alloyed with the metallic porous product and that the titanium oxide particles are uniformly dispersed in the skeleton constituent metal of the metallic porous product. The metallic porous product had a hardness of 210 micro-vickers when it contained only a metal mixture of nickel and chromium at a content ratio of 30:70 and a hardness of 270 micro-vickers when it had a 20 volume % titanium oxide content of a metal mixture.

Figure 11:
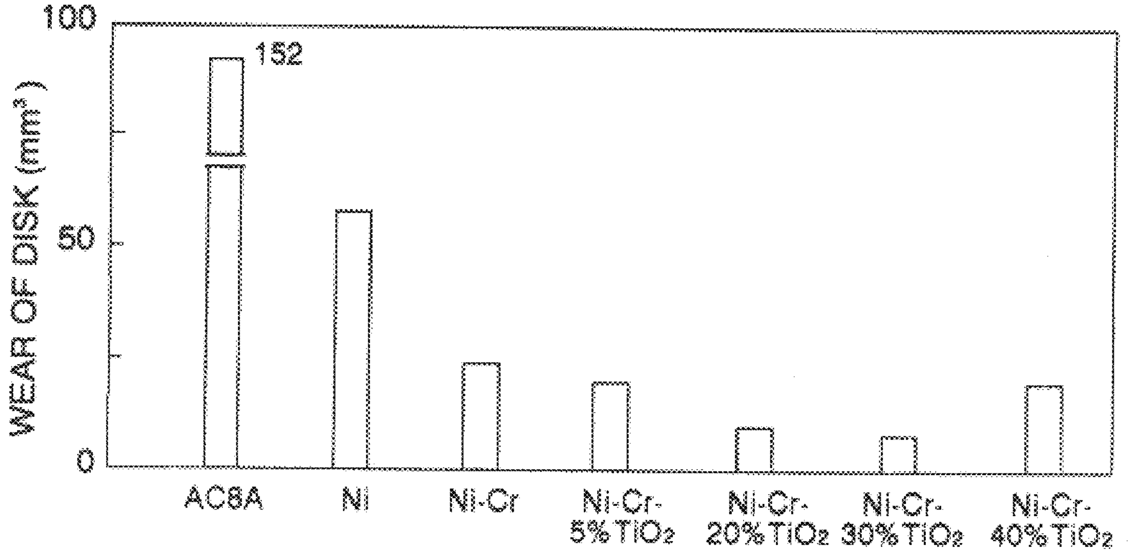
FIG. 11 is a diagrammatic view showing a result of a ring-disk wear test of aluminum alloy composite products provided by the use of a metallic porous product shown in FIG. 9 of which the titanium oxide content is 20 volume %.

Wear resistance of the aluminum alloy composite product was evaluated by the same ring-disk wear test as previously described above. The test result is shown in FIG. 11. As revealed from FIG. 10, as compared with the aluminum alloy composite product made by the use of a nickel porous product, the aluminum alloy composite product made by the use of a nickel porous product which is alloyed with chromium or contains a specified amount of titanium oxide yields a significantly improvement of wear resistance.

Figure 12:
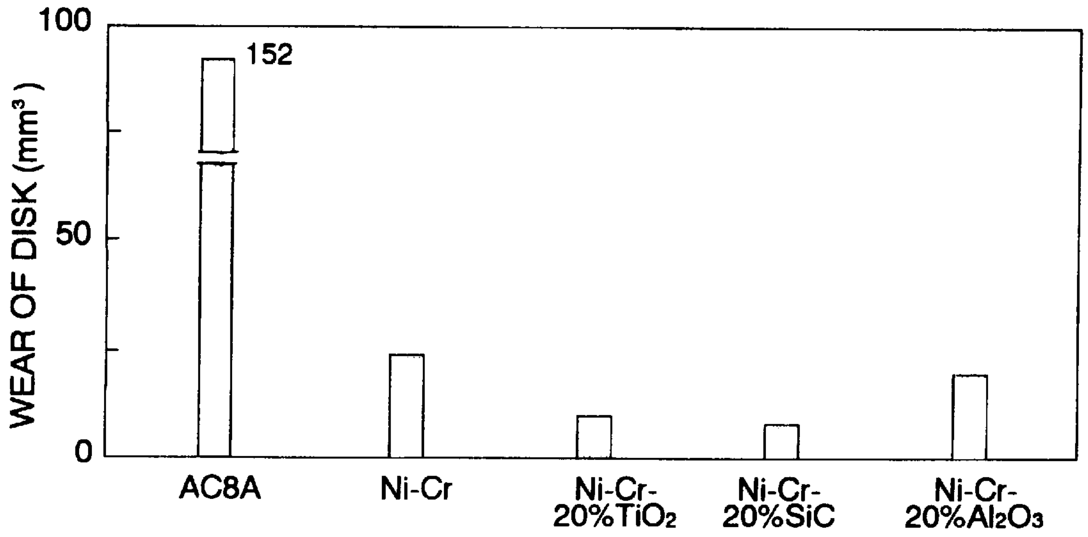
FIG. 12 is a diagrammatic view showing a result of a ring-disk wear test of aluminum alloy composite products provided by the use of a metallic porous product which contains silicon carbide or a silicon oxide in place of an aluminum oxide.

Further, aluminum alloy composite products were made as test samples by the use of metallic porous products containing silicon carbide or an aluminum oxide in place of a titanium oxide and subjected to the same ring-disk wear test the result of which is shown in FIG. 12. As apparent from FIG. 12, silicon carbide and an aluminum oxide makes contribution to improvement of wear resistance of the aluminum alloy composite product.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A metallic porous product for producing a composite product, said metallic porous product being produced as a metallic skeleton structure by applying a slurry of a skeleton constituent material to an inflammable foam having open pores, burning away said inflammable foam so as to form a metallic skeleton structure, and sintering said metallic skeleton structure, said skeleton constituent material comprising:

powder of a metal selected from a group of nickel (Ni) and nickel alloys; and abrasion resistance modifying particles comprising chromium (Cr) particles that are alloyed with said metal and ceramic particles, both said chromium (Cr) particles and said ceramic particles being dispersed in said powder of said metal;

wherein said metallic skeleton structure has a Vickers hardness greater than 190, a porous volume of approximately 5 to 20% and a ceramic content of approximately 5 to 30 weight % of said metallic skeleton structure.

2. The metallic porous product as defined in claim 1 wherein said metallic skeleton structure has a chromium (Cr) content of approximately 25 to 35 weight % of said metallic skeleton structure.

3. The metal porous product as defined in claim 1 wherein said ceramic particles comprises at least one selected from a group of silicon carbide (SiC), a silicon oxide ($SiO_2$), an aluminum oxide ($Al_2O_3$), a titanium oxide ($TiO_2$),, a silicon nitride ($Si_3N_4$), an aluminum nitride (AIN), and a titanium nitride (TiN).

4. The metallic porous product as defined in claim 1, wherein said metallic porous product is a piston of an internal combustion engine.

* * * * *